United States Patent
Hill et al.

[15] 3,661,376
[45] May 9, 1972

[54] SUPPORT HAVING THREE AXES OF ADJUSTMENT AND A SINGLE LOCKING HANDLE

[72] Inventors: Dwight A. Hill, 1740 Huntington Drive, South Pasadena, Calif. 91030; Otto F. Colbert, 6309 South Pickering Avenue, Whittier, Calif. 90601

[22] Filed: Apr. 9, 1970

[21] Appl. No.: 27,039

[52] U.S. Cl. ............................... 269/75, 248/183, 269/76, 85/155
[51] Int. Cl. .................................................. B23q 1/04
[58] Field of Search .................. 248/183, 413; 287/52.08; 269/75, 76; 85/155

[56] References Cited

UNITED STATES PATENTS

| | | | |
|---|---|---|---|
| 2,898,068 | 8/1959 | Warren | 248/183 |
| 2,322,803 | 6/1943 | Koch | 287/52.08 X |
| 2,614,872 | 10/1952 | Heidegger et al. | 287/52.08 |

Primary Examiner—William H. Schultz
Attorney—Luc P. Benoit

[57] ABSTRACT

A work support device has a base structure, a split carrier rotatably mounted on the base structure, a post, and a split bushing for releasably receiving the post and for selectively gripping the post. The split bushing is mounted within the split carrier for turning movement about an axis, and the split carrier, the split bushing and the post are selectively arrestable and subsequently releasable upon actuation of a single clamp device.

To increase the range of adjustment, and decrease the requisite power for adjustment and adjustment friction, a leaf spring is provided in force transmitting relationship with the split bushing and resiliently bendable toward the split bushing at the above mentioned axis of movement of the split bushing. The clamp device then includes a bolt which has a certain cross-section and a tip portion which is in force transmitting relationship with the leaf spring within an area of force transmission that is several times smaller than the bolt cross-section and that has a center located substantially on the axis of movement of the split bushing.

10 Claims, 6 Drawing Figures

PATENTED MAY 9 1972
3,661,376
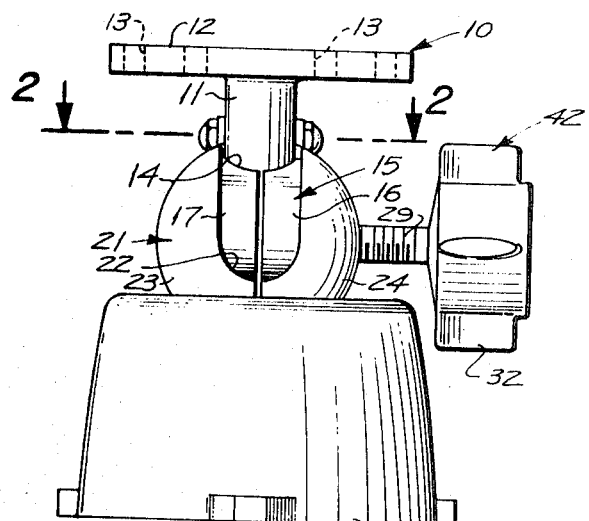
Fig.1
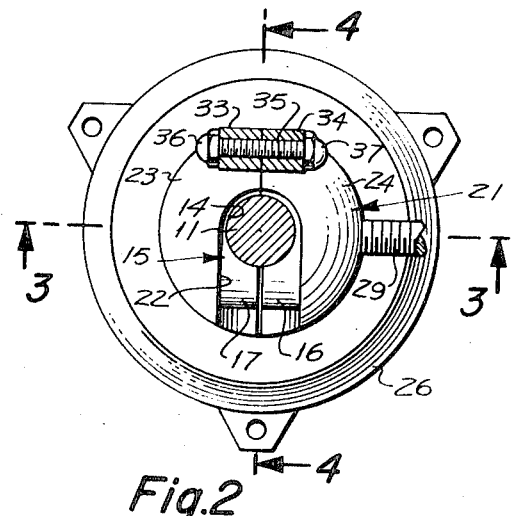
Fig.2
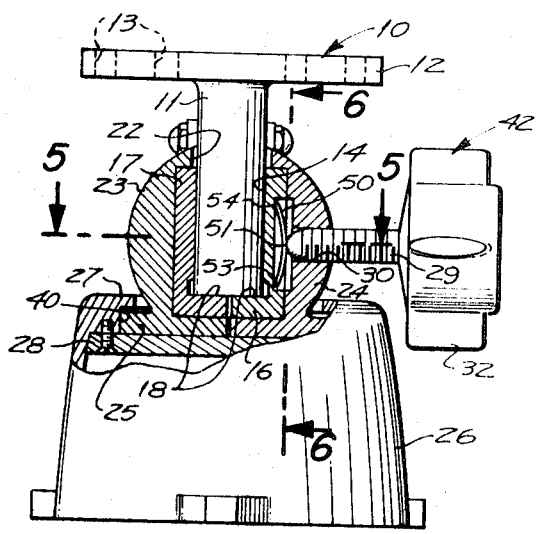
Fig.3
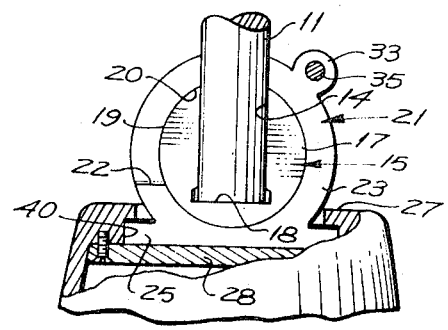
Fig.4
Fig.5
Fig.6
INVENTORS
DWIGHT A. HILL
OTTO F. COLBERT
BY
*Ane P. Benoit*
ATTORNEY

SUPPORT HAVING THREE AXES OF ADJUSTMENT AND A SINGLE LOCKING HANDLE

BACKGROUND OF THE INVENTION

1. Field of the Invention

The subject invention relates to work support devices which may be turned or tilted about three axes of adjustment and may selectively be arrested in selected positions by actuation of a single clamp device.

2. Description of the Prior Art

A highly advanced work support device of the type mentioned in the preceding paragraph is disclosed and claimed in U.S. Pat. No. 2,898,068, Support Having Three Axes of Adjustment and a Single Locking Handle, issued Aug. 4, 1959, the disclosure of which is herewith incorporated by reference herein.

That patented device presents an outstanding advance in the art of work support devices and has found widespread acceptance among manufacturers, artisans and hobbyists.

Practical experience and tests have shown, however, that the work support device would serve its intended function yet better if the range between locking and free-motion adjustment of the various parts (split carrier, split bushing, and post) could somehow be extended, and if an adjustment within such range, after having been effected, could be maintained unaffected by turning motions of the post and split bushing, for instance.

In addition any reduction in the force requisite for adjusting the various parts within the above mentioned range would constitute a considerable advance in the art, inasmuch as even small improvements in this area are of prime importance in terms of attainable precision and reduction of effort for large numbers of manufacturing and service employees and recreational hobbyists.

SUMMARY OF THE INVENTION

The subject invention provides the above mentioned desiderata thereby materially improving the operation, performance and facility of adjustment of an already greatly improved device.

The invention resides in a work support device which comprises, in combination, a base structure, a split carrier rotatably mounted in the base structure, a post, and a split bushing for releasably receiving the post and for selectively gripping this post. The split bushing is mounted within the split carrier for turning movement about an axis.

In accordance with the subject invention, the combination described in the preceding paragraph includes as essential elements a leaf spring having peripheral portions in force transmitting relationship with the bushing and spaced from the split carrier and having a central portion biased away from the bushing at the aforementioned axis, and adjustable clamp means in force transmitting relationship with the split carrier and the leaf spring for selectively actuating the split carrier into locking engagement with the base, and the split bushing into locking engagement with the split carrier and gripping engagement with the post.

Further in accordance with the subject invention, the clamp means of the combination under discussion include a bolt having substantially a predetermined cross-section and being threaded into the split carrier. This bolt extends substantially along the above mentioned axis of movement of the split carrier and, in accordance with the subject invention, has a tip portion in force transmitting relationship with the leaf spring within an area of force transmission which is several times smaller than the bolt cross-section and which has a center located substantially on the aforesaid axis.

By way of clarification, the cross-section of the threaded bolt previously referred to is meant to be the cross-section of the solid part of the bolt inside the thread, rather than the overall cross-section of the bolt measured over the thread.

In accordance with a preferred embodiment of the subject invention, the aforementioned leaf spring comprises a resilient disc which is peripherally in force transmitting engagement with the split bushing and which has at least a center portion spaced from the split bushing. The spaced center portion of the resilient disc is preferably located on the above mentioned axis of movement of the split bushing, and the tip portion of the threaded bolt preferably engages the resilient disc at the center portion.

In accordance with a further preferred embodiment of the subject invention, the leaf spring is cylindrically bent and has peripheral portions in force transmitting engagement with the split bushing and an elongate central portion biased away from the split bushing. The biased central portion of the leaf spring preferably extends through the aforementioned axis, and the tip portion of the bolt preferably engages the biased central portion.

In accordance with a related preferred embodiment of the subject invention, the tip portion is integral with and projects from the threaded bolt. While not intended to be restricted in this manner, the bolt preferably has a convexly shaped end which culminates in the aforementioned tip portion.

In accordance with a yet further preferred embodiment of the subject invention, the leaf spring comprises a resilient disc being substantially cylindrically bent and having peripheral portions in force transmitting engagement with the split bushing and an elongate central portion biased away from the split bushing and extending through the aforesaid axis. The tip portion of the threaded bolt then engages the central portion of the resilient disc at the latter axis.

In accordance with a further preferred embodiment of the subject invention, the leaf spring in any of the preceding embodiments may be, and preferably is, constructed and positioned to be selectively movable into substantially rigid engagement with the split bushing by action of the bolt tip on the leaf spring.

BRIEF DESCRIPTION OF THE DRAWINGS

The invention and its organization and function will become more readily apparent form the following detailed description of preferred embodiments thereof, one of which is illustrated by way of example in the accompanying drawings, in which:

FIG. 1 is a side elevation of a preferred work support device;

FIG. 2 is a plan view, partially in section, taken substantially on the lines 2—2 in FIG. 1;

FIG. 3 is a sectional elevation taken substantially on the lines 3—3 in FIG. 2 and showing one view of the illustrated embodiment of the subject invention;

FIG. 4 is a sectional elevation, partly broken away, and taken substantially on the lines 4—4 in FIG. 3;

FIG. 5 is a sectional detail taken substantially on the lines 5—5 in FIG. 3 and showing another view of the illustrated preferred embodiment; and FIG. 6 is a further sectional elevation, partly broken away, taken substantially on the lines 6—6 in FIG. 3, and showing yet another view of the illustrated preferred embodiment.

DESCRIPTION OF PREFERRED EMBODIMENTS

Referring to the drawings and to the above description, it should be understood at this juncture that the subject invention is not intended to be restricted in scope to devices of the type disclosed in the above mentioned U.S. Pat. No. 2,898,068, but is to be interpreted as broadly as the accompanying claims, as granted, admit.

For convenience and by way of preferred example, the preferred embodiments are, however, disclosed hereinafter on the basis of the type of device covered in the cited patent.

Accordingly, a work support member generally designated 10 includes a cylindrical post 11 carrying an apertured flange or table 12 at its outer end. Openings 13 are provided in the table 12 for fastening work or work-holding devices of any nature to the upper surface of the table.

The post 11 is received within a cylindrical bore 14 provided by a split bushing 15. This bushing is split on a plane containing the axis of the post 11 to form two parts 16 and 17. The lower end of the post 11 rests on end surfaces 18.

In side elevation, as shown best in FIG. 4, the split bushing 15 is generally circular and has an outer cylindrical surface 19 that is received within a cylindrical cavity 20 provided in a carrier 21. The axis of the cylindrical cavity 20 intersects the axis of the post 11 at right angles. An arcuate clearance slot 22 is provided in the carrier 21 and the post 11 extends through this slot. The carrier 21 is split into two separate elements 23 and 24 and the plane of separation is substantially the same as the plane of separation of the bushing halves 16 and 17.

The carrier 21 has a circular flange 25 which is received within a bore 40 in the stationary base 26. A lip 27 and a detachable retainer plate 28 maintain the flange 25 in position on the base 26. The base 26 may be secured to a work bench or table or other support by any convenient means.

Assumining that the base 26 is secured to a horizontal surface, the carrier 21 is free to turn with respect to the base about a vertical axis. The split bushing 15 is free to turn with respect to the carrier 21 about a horizontal axis and the extent of movement is limited by the length of the arcuate slot 22. The post 11 is free to turn with respect to the bushing 15 about its own longitudinal axis.

All of these motions may be arrested simultaneously and the post 11, split bushing 15, and split carrier 21 locked in any desired position by manual actuation of an adjustable clamping device 42. This device includes a threaded bolt or screw 29 and a manually engageable knob 32 for turning and adjusting the bolt 29.

The bolt 29 extends along the turning axis of the bushing 15. To this end, the bolt 29 is received in a bore 30 located in the carrier section 24 and coaxial with the latter turning axis.

In previous devices the inner end of the threaded bolt 29 was substantially flat and directly contacted the bushing section 16. This had several disadvantages in practice. For one thing, this construction resulted in an undesirable feedback of power when the post 11 was swung about during adjustment intervals.

To gain a fuller understanding of this aspect, assume that the support 10 is in a given position and is to be moved into another position by a movement which necessitates a swinging motion of the post 11 in a vertical plane. To effect this adjustment, the workman would somewhat loosen the split bushing 15 from engagement with the carrier 21, and the bolt 29 from engagement with the bushing section 16, by manual rotation of the knob 32. This loosening would only be sufficient to permit manual adjustment of the table 10 in any one or more axes of attainable adjustment, and would not be carried to the extreme of permitting adjustments to collapse by weight of gravity before the desired position can be arrested.

Unfortunately, however, the latter is prone to happen in previous devices despite the operator's caution. When the post 11 is swung in a vertical plane, the bushing 15 is turned in the carrier 21. If the bolt in previous devices is in engagement with the bushing section 16 as described above, rotary motion of the bushing 15 imparts rotary motion to the bolt 29. During adjustments in one of the two possible directions of rotary motion of the bushing 15, the bolt 29 is thus unduly loosened from engagement with the bushing 15. In practice, this is not only annoying, but also interferes with the otherwise inherently attainable performance of the device.

In addition, the range of adjustment of the clamping device 42 is quite narrow if the bolt 29 directly engages the bushing section 16. A full understanding of this drawback is attained if it is realized that no adjustment of the various parts is possible if these parts have been locked by a tightening of the clamping device 42. At the other extreme, no workable adjustment action is possible if the clamping device 42 has been loosened to an extent permitting practically free motion of the parts 11, 15 and 21 in their bearings.

In practice, frictional restraints on the latter parts are necessary for their proper adjustment. The optimum degree of such frictional restraint varies from case to case, and is dependent on such factors as the specific task to be performed and the operator's working habits and preferences.

It is, accordingly, highly desirable that there be a wider range between the above mentioned extremes of locked parts position on the one hand, and free parts motion on the other hand.

Our subject invention considerably extends the latter range and at the same time inhibits an undesirable feedback of rotary power form the bushing 15 to the clamping device 42.

To this end, the subject invention provides a combination of essential features which include a leaf spring 50 in force transmitting relationship with the bushing 15 and resiliently bendable toward the bushing at the turning axis of this bushing, and which further include a tip portion 51 on the bolt 29 in force transmitting relationship with the leaf spring 50 within a small area of force transmission which is several times smaller than the cross-section of the bolt inside its thread, and which has a center located on the turning axis of the bushing 15.

If desired, the leaf spring 50 may be flat (such as in the form of a flat circular disc) and may be peripherally supported on a shoulder (not shown) located on the bushing section 16 to keep the center of the leaf spring spaced from this bushing section for subsequent resilient movement of the leaf spring center relative to the bushing section 16, and eventual engagement of the leaf spring center with the bushing section 16 by action of the clamping device 42.

In accordance with the illustrated preferred embodiment, however, the leaf spring 50 is not only in the form of a resilient circular disc, but is also cylindrically bent so that peripheral portions 53 and 54 of the spring are in force transmitting engagement with the bushing section 16, while an elongate central portion 56 of the spring is biased away from the bushing section 16. As seen in FIGS. 3 and 5 the peripheral portions 53 and 54 of the spring 50 are spaced from the split carrier 21 and in particular from the split carrier element 24.

The latter raised portion 56 extends through the turning axis of the split bushing 15 and is engaged by the tip portion 51 of the threaded bolt 29. In the illustrated preferred embodiment, the bolt 29 has a convexly shaped end which culminates at its extremity in the requisite tip portion 51. In this manner, the tip portion 51 engages the spring 50 only within an area of contact that is several times smaller than the cross-section of the bolt 29. Of course, other tip configurations may be employed as long as the latter small area of contact and force transmission is provided and preserved.

As the clamping device 42 is selectively tightened and loosened any desired degree of relative mobility of the parts 11, 15 and 21 are readily realized within a wide range of adjustment. Since by virtue of the illustrated tipped bolt and bent disc configuration the spring 50 contacts the bolt 29 only within a small section of the top ridge or elongated central portion 56 of the cylindrically bent disc, an undesired feedback of loosening power from the bushing 15 to the bolt 29 is reliably inhibited.

Whenever a locking of parts in a chosen position is desired, the clamping device 42 is tightened until the spring 50 "bottoms" on the bushing section 16 into substantially rigid engagement therewith.

In addition to all these advantages, the subject invention unexpectedly yields yet another benefit. While we do not wish to limit ourselves to any particular theory, or to subscribe thereto, we offer the following explanation of the advantage presently under discussion.

If all travels and dimensions are expressed in centimeters ($10^{-2}$ meters) and all the forces in kilograms ($10^3$ grams), the following approximation may be employed:

$$f = \frac{0.217}{Eh^3} P[2.54a^2 - 1.52b^2 - b^2 \ln(a/b)] \quad (1)$$

wherein $f$ = flexural travel of the raised portion 56 of the spring 50 toward the bushing section 16;
$P$ = force exerted by the clamping device 42;
$E$ = modulus of elasticity of the spring 50;
$h$ = thickness of the spring 50;
$a$ = radius of the spring 50;
$b$ = radius of the area of contact and force transmission of the bolt tip 51;
$1n$ = natural logarithm.

If we set $Eh^3/0.217 = K$ and resolve for P, we may write:

$$P = \frac{Kf}{2.54a^2 - 1.52b^2 - b^2 1n(a/b)} \qquad (2)$$

We may further simplify this by setting the parameter $2.54a^2$, relating to the radius of the spring disc area, equal to an arbitrary constant A, so as to obtain:

$$P = \frac{Kf}{A - 1.52b^2 - b^2 1n(a/b)} \qquad (3)$$

If we now decrease in a practical embodiment the factor $b$ by reducing, during the manufacture of the bolt 29, the area of the crest of the tip 51 and therewith the area of contact with the spring 50, we will see that $b^2$, being a square function, decreases very rapidly thereby even overcoming increases in the logarithmic ratio $(a/b)$. Since both $b^2$ factors are negative and are located in the denominator, we can readily deduce from equation (3) that the requisite force P becomes smaller as the factor $b$ decreases.

The illustrated bent spring and reduced tip combination thus yields the additional advantage of a reduced force requirement on the clamping device 42.

Motion of the various parts of the illustrated device may thus conveniently be arrested by turning the single knob 32 in a direction to advance the tip portion 51 towards the bushing section 16 until the spring 50 bottoms on and tightly engages that bushing section. In this manner, the post 11 is clamped frictionally between the halves 16 and 17 of the split bushing 15. Reaction force of the bolt 29 on the part 24 serves to spread the parts 23 and 24 of the carrier 21 and this latter spreading action causes the flange 25 to be gripped frictionally within the enclosing shoulder of the bore 40 on the base 26.

The result is that all of the parts are frictionally clamped against movement by the action of the single clamping device 42. Accordingly, the craftsman can use one hand to adjust the position of the work support 10 and use the other hand to clamp all of the parts holding the work support in its adjusted position.

Ears 33 and 34 may be formed integrally on the parts 23 and 24 respectively and these ears may be interconnected by a central threaded fastener 35 having nuts 36 and 37 threaded on its ends. This construction assures that the carrier 21 swivels as a unit with respect to the base 26 and yet does not interfere with the spreading action between the parts 23 and 24 under action of the clamping device 42. The nuts 36 and 37 are, however, preferably spaced such as to limit the lateral travel of the spreading parts 23 and 24, whereby to strengthen the mechanical integrity of the work support device upon tightening of the clamping device 42.

It will be understood that the work supporting table 12 may take any convenient or desirable form and may be equipped with or replaced by a vise or work grips of any desired form.

We claim:

1. A work support device comprising in combination:
   a base structure;
   a split carrier rotatably mounted on the base structure;
   a post;
   a split bushing for releasably receiving said post and for selectively gripping said post, said split bushing being mounted within said split carrier for turning movement about an axis;
   a leaf spring having peripheral portions in force transmitting relationship with said bushing and spaced from said split carrier, and having a central portion biased away from said bushing at said axis; and
   adjustable clamp means in force transmitting relationship with said split carrier and said leaf spring for selectively actuating the split carrier into locking engagement with the base, and the split bushing into locking engagement with the split carrier and gripping engagement with the post, said adjustable clamp means including a bolt having substantially a predetermined cross-section and being threaded into said split carrier, said bolt extending substantially along said axis and having a tip portion in force transmitting relationship with said leaf spring within an area of force transmission being several times smaller than said bolt cross-section and having a center located substantially on said axis.

2. A work support device as claimed in claim 1, wherein:
   said leaf spring comprises a resilient disc being peripherally in force transmitting engagement with said split bushing and having at least a center portion spaced from said split bushing.

3. A work support device as claimed in claim 2, wherein:
   said spaced center portion of the resilient disc is located on said axis; and
   said tip portion of said bolt engages the resilient disc at said center portion.

4. A work support device as claimed in claim 1, wherein:
   said tip portion is integral with and projects from said bolt.

5. A work support device as claimed in claim 1, wherein:
   said bolt has a convexly shaped end culminating in said tip portion.

6. A work support device as claimed in claim 1, wherein:
   said leaf spring is substantially cylindrically bent and has peripheral portions in force transmitting engagement with said split bushing and an elongate central portion biased away from said split bushing.

7. A work support device as claimed in claim 6, wherein:
   said biased central portion of the leaf spring extends through said axis; and
   said tip portion of said bolt engages said biased central portion.

8. A work support device as claimed in claim 7, wherein:
   said bolt has a convexly shaped end culminating in said tip portion.

9. A work support device as claimed in claim 1, wherein:
   said leaf spring comprises a resilient disc being substantially cylindrically bent and having peripheral portions in force transmitting engagement with said split bushing and an elongate central portion biased way from said split bushing and extending through said axis; and
   said tip portion of said bolt engages said central portion of said resilient disc at said axis.

10. A work support device as claimed in claim 1, wherein:
    said leaf spring is constructed and positioned to be selectively movable into substantially rigid engagement with said split bushing by action of said bolt tip on the leaf spring.

* * * * *